United States Patent [19]

Kim

[11] 4,179,737
[45] Dec. 18, 1979

[54] MEANS AND METHODS FOR PROVIDING GREATER SPEED AND FLEXIBILITY OF MICROINSTRUCTION SEQUENCING

[75] Inventor: Dongsung R. Kim, Laguna Hills, Calif.

[73] Assignee: Burroughs Corporation, Detroit, Mich.

[21] Appl. No.: 864,150

[22] Filed: Dec. 23, 1977

[51] Int. Cl.$^2$ .............................. G06F 9/20
[52] U.S. Cl. ................................ 364/200
[58] Field of Search ... 364/200 MS File, 900 MS File

[56] References Cited

U.S. PATENT DOCUMENTS

| | | | |
|---|---|---|---|
| 3,418,638 | 12/1968 | Anderson et al. | 364/200 |
| 3,654,448 | 4/1972 | Hitt | 364/200 |
| 3,736,566 | 5/1973 | Anderson | 364/200 |
| 3,766,532 | 10/1973 | Liebel, Jr. | 364/200 |
| 3,956,738 | 5/1976 | Tessera | 364/200 |
| 4,037,202 | 7/1977 | Terzian | 364/200 |
| 4,038,643 | 7/1977 | Kim | 364/200 |
| 4,070,703 | 1/1978 | Negi | 364/200 |

Primary Examiner—Gareth D. Shaw
Assistant Examiner—E. Chan
Attorney, Agent, or Firm—Nathan Cass; Kevin R. Peterson; Edward J. Feeney, Jr.

[57] ABSTRACT

Improved means and methods for providing highly flexible microinstruction sequencing in a microprogrammed digital data processing system particularly with regard to the handling of specialized types of sequencing situations such as are involved in wait-loop and repeat situations. The microprogramming control system is implemented using a plurality of programmable read only memories storing control words chosen so as to provide for microinstruction sequencing in a manner which in the first instance assumes that no branching possibilities are present, even though one or more branching possibilities may in fact be present in the microinstruction flow path, thereby permitting very fast microinstruction sequencing when the assumed sequencing is correct. Means are provided for monitoring the correctness of microinstruction sequencing concurrently with the execution of a microinstruction during each cycle for which a branching decision is required, and for correcting an incorrect assumed sequence in a highly flexible manner with minimum penalty on processing time using microinstruction indexing and inhibiting signals which are selectively provided in response to the states of selected system conditions during the cycle. Means and methods are also provided to permit the implementation provided for monitoring and correction to also be used to provide greater flexibility in the handling of specialized types of sequencing situations such as are involved in wait-loop and repeat situations.

16 Claims, 16 Drawing Figures

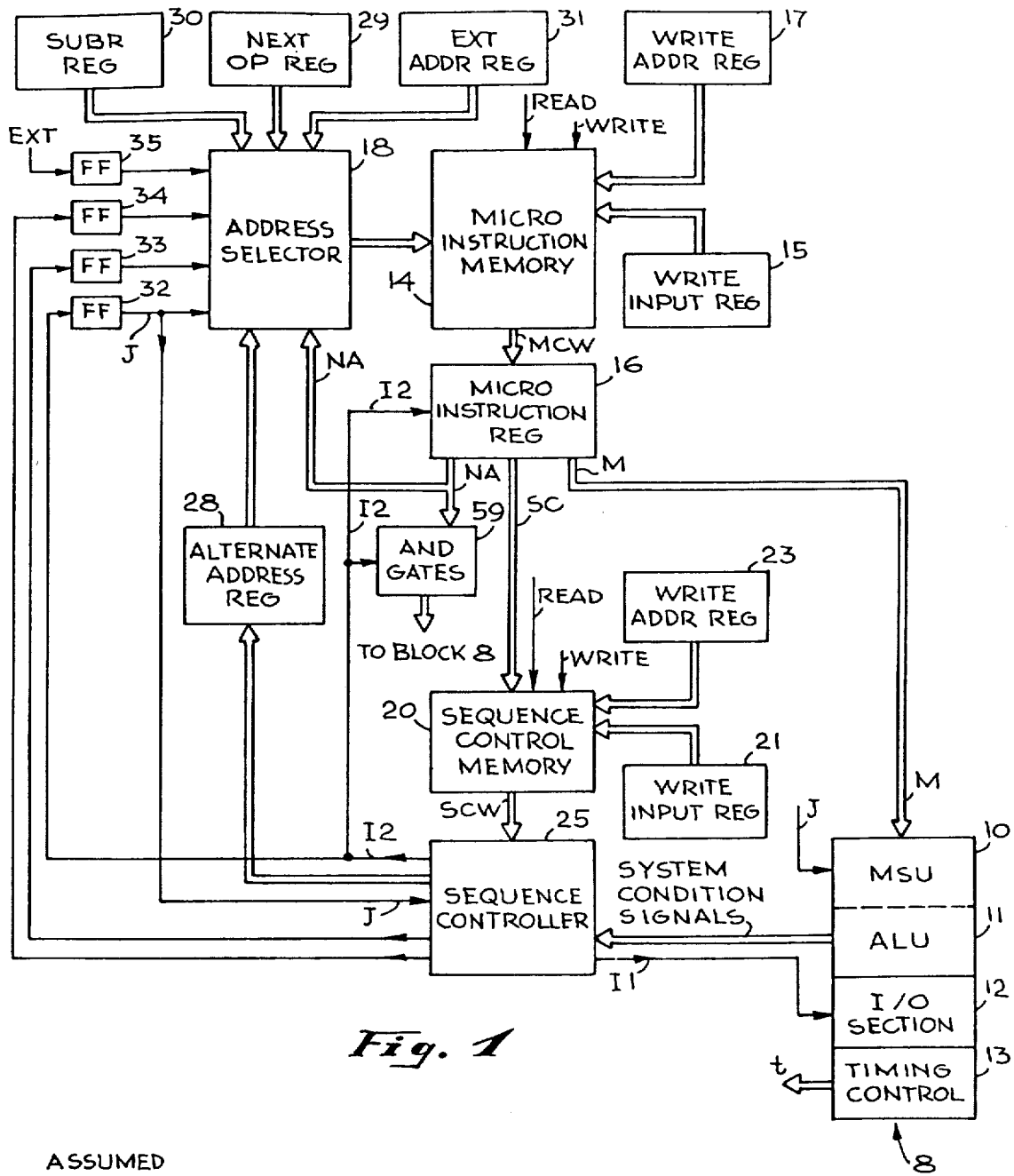

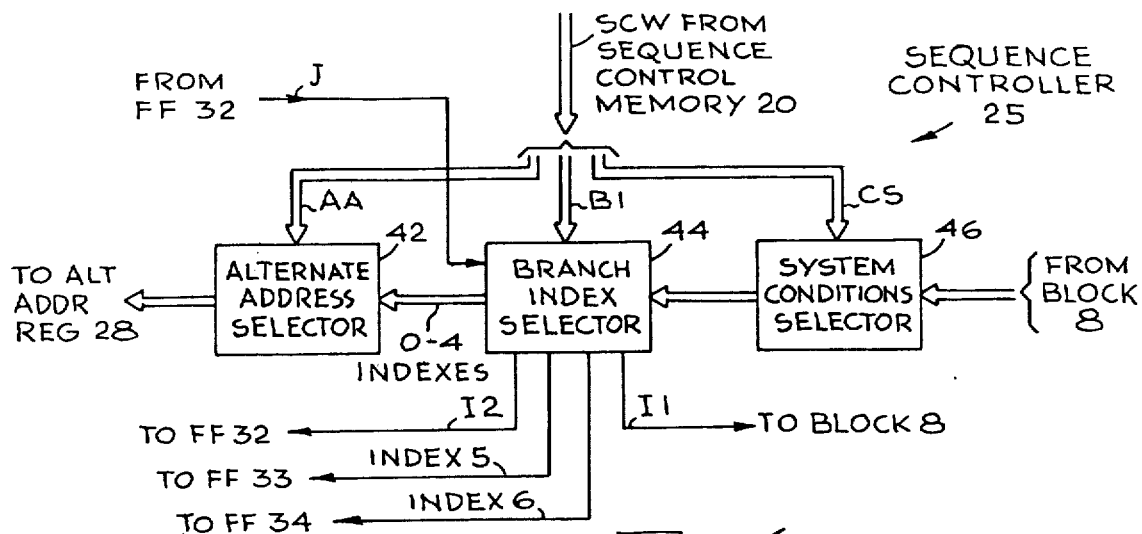
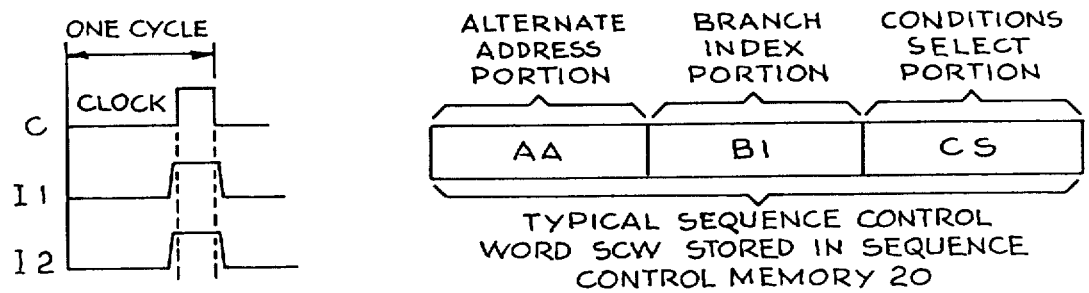
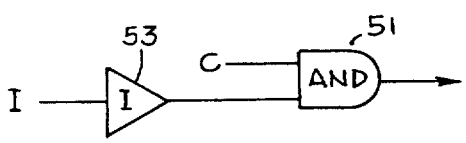

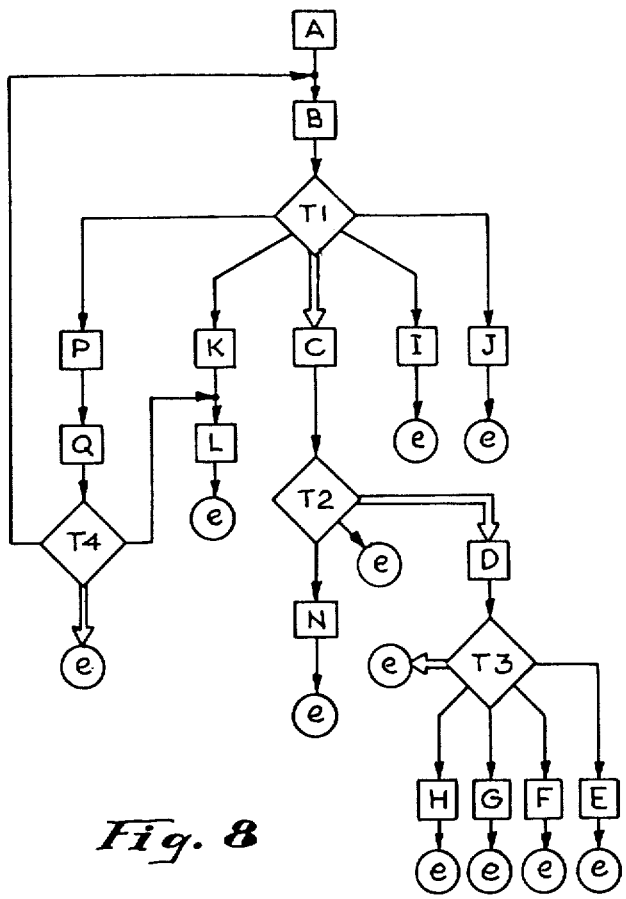
*Fig. 8*
MICROINSTRUCTION CONTROL WORDS MCW STORED IN MICROINSTRUCTION MEMORY 14 (FIG. 1)
|  | NA | SC | M |
|---|---|---|---|
| MCW-A | ADDR B | SC-T0 | A |
| MCW-B | ADDR C | SC-T1 | B |
| MCW-C | ADDR D | SC-T2 | C |
| MCW-D | e | SC-T3 | D |
| MCW-E | e | SC-T0 | E |
| MCW-F | e | SC-T0 | F |
| MCW-G | e | SC-T0 | G |
| MCW-H | e | SC-T0 | H |
| MCW-I | e | SC-T0 | I |
| MCW-J | e | SC-T0 | J |
| MCW-K | ADDR L | SC-T0 | K |
| MCW-L | e | SC-T0 | L |
| MCW-N | e | SC-T0 | N |
| MCW-P | ADDR Q | SC-T0 | P |
| MCW-Q | e | SC-T4 | Q |
*Fig. 9*
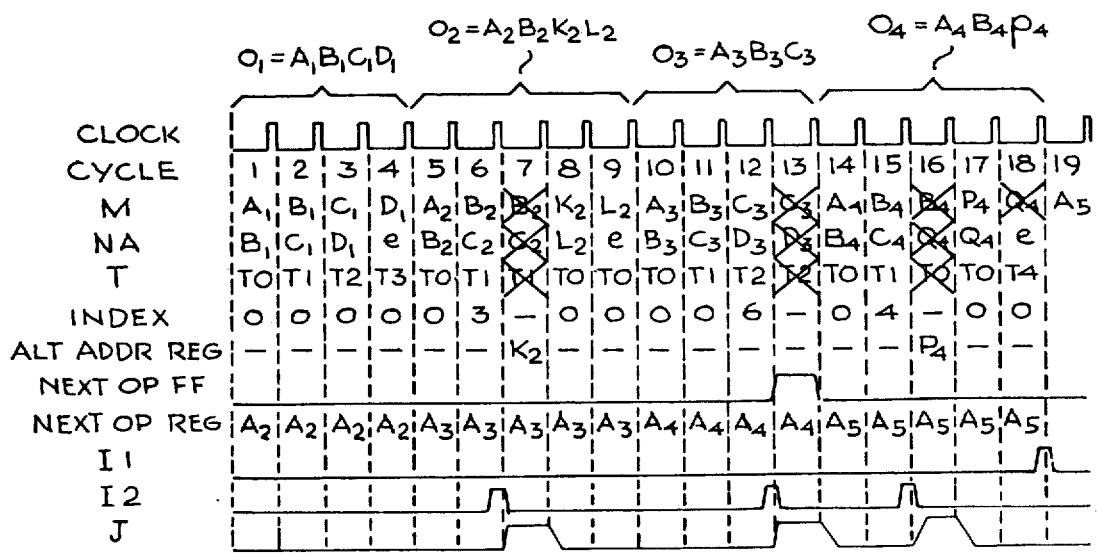
*Fig. 11*

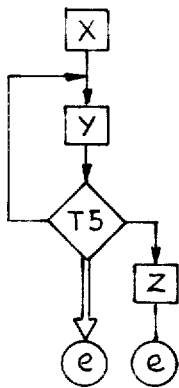
Fig. 12
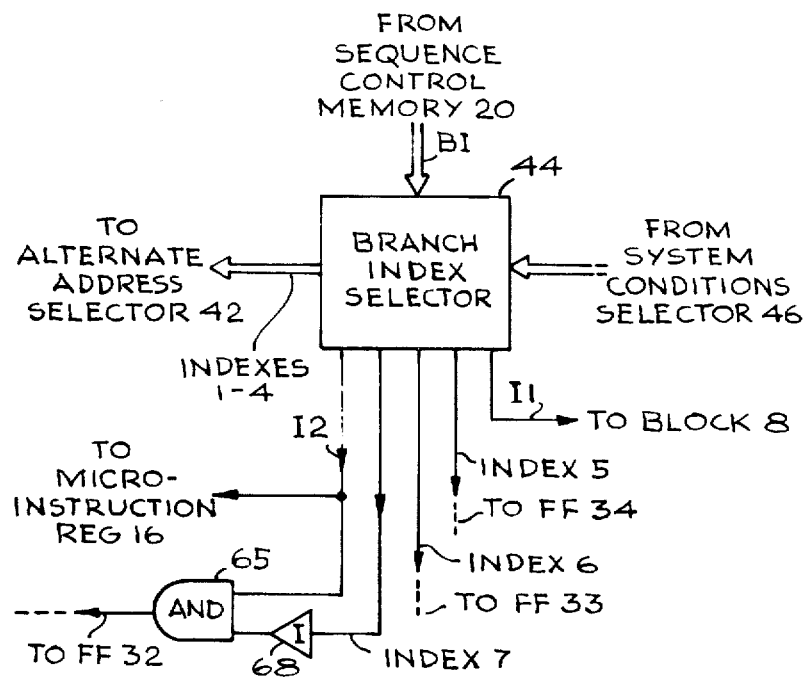
Fig. 13
Fig. 14
| | NA | SC | M |
|---|---|---|---|
| MCW-X | ADDR Y | SC-T0 | X |
| MCW-Y | e | SC-T5 | Y |
| MCW-Z | e | SC-T0 | Z |
Fig. 15
| | AA | BI | | | | | | | | CS |
|---|---|---|---|---|---|---|---|---|---|---|
| SCW-T5 | Z --- | 000 | 101 | 701 | 711 | 000 | 701 | 711 | 000 --- | T5 |
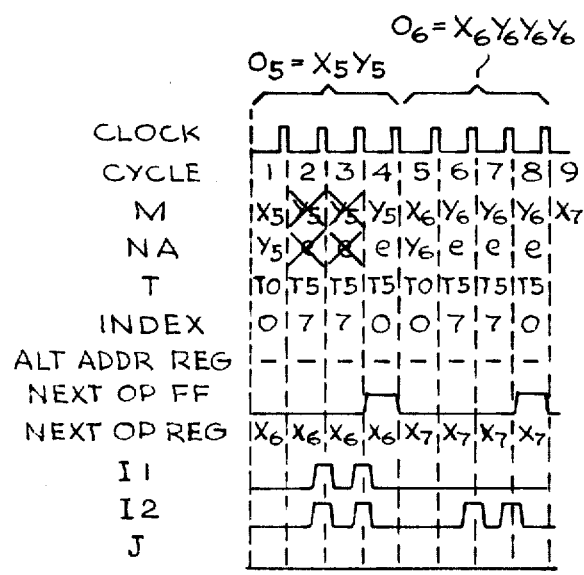
Fig. 16

MEANS AND METHODS FOR PROVIDING GREATER SPEED AND FLEXIBILITY OF MICROINSTRUCTION SEQUENCING

REFERENCE TO RELATED APPLICATION

This application contains subject matter related to that contained in copending patent application Ser. No. 856,411, filed Dec. 1, 1977 now U.S. Pat. No. 4,155,120 for Means and Methods for Controlling Microinstruction Sequencing.

BACKGROUND OF THE INVENTION

The present invention relates generally to improved means and methods for controlling the operation of digital computers. More particularly, the present invention is directed to improved means and methods for controlling the sequencing and branching of microinstructions in a microprogrammed digital computer.

A particular architectural concept that has allowed for more flexibility in computer design and also in computer programming has been the concept of microinstructions. Initially, a microinstruction was thought of as merely a set of control bits employed within a macroinstruction format. Such control bits were employed to provide a corrective measure during the execution of a multiplying instruction or shift instruction and the like. Gradually, as the microprogramming concept enlarged, the macroinstruction specified the particular routine to be performed, such as the addition of two operands. The execution of the macroinstruction was then accomplished through a sequence of executions of microinstructions, each of which specified the particular gates to be set thereby. Since a plurality of macroinstructions could be implemented by a finite set of microinstructions, it was then apparent that these same microinstructions could be stored in a separate storage to be addressed in a particular sequence upon the execution of different macroinstructions. It was further recognized that various sequences of microinstructions could be formulated to carry out the particular operations and separately stored in any memory. Thus, a great variety of sequences of microinstructions could be created to carry out a great variety of routines.

The concept of microinstructions or microprograms, then, became one of providing sub-instructional sets which were masked or hidden from the programmer, thus, simplifying the writing of particular programs by minimizing the number of individual specific steps that had to be called for by the programmer. Furthermore, the concept of microprogramming allows the computer designer to design a more inexpensive computer system that could provide a great variety of routines to the computer user without the requirement of individual functions being implemented in hard-wired circuitry.

Microprogramming may thus be broadly viewed as a technique for designing and implementing the control function of a digital computer system as sequences of control signals that are organized on a word basis and stored in a fixed or dynamically changeable control memory. Detailed examples of some known approaches to the design of microprogrammed digital computers can be found in the book by S. S. Husson, "Microprogramming: Principles and Practices", Prentice-Hall, Inc. (1970), the contents of which are to be regarded as incorporated herein by this reference.

As will be apparent from the referenced Husson book, a prior art microprogram control memory may typically comprise a selectively addressable control memory having microinstruction control words stored at selectable addressable locations thereof. Normally, microinstruction control words are accessed sequentially from the control memory. In order to provide for branching, each control word may typically include, in addition to the microinstruction bits, special next address bits and test select bits which are applied to branching logic along with system condition signals to determine the address of the next microinstruction.

As the computer art progressed, a need arose for greater numbers and types of stored microinstruction control words to be available from the microinstruction memory which led to the provision of Read/Write microinstruction memories in which selected microinstructions could be provided from the processor main memory under program control so as to give the programmer the ability to modify the microinstruction control words in the microinstruction memory. Examples of such Read/Write microinstruction memories will be found in U.S. Pat. Nos. 3,478,322; 3,792,441 and 3,739,352.

One result of the provision of Read/Write microinstruction memories has been to permit greater control and flexibility over the particular microinstruction sequencing to be provided by a data processor as it performs its various programs. However, it has been found difficult to provide for optimization of microinstruction sequencing because of the wide variety of microinstruction flow paths which may occur in executing a program, for example, because of the many possible branching (i.e. conditional sequencing) options which are typically provided in the microinstruction flow path, each branch point normally requiring a longer time to determine the proper branch as compared to the time required when an unconditional sequence situation is present. Thus, although a data processor may provide a relatively fast performable single microinstruction cycle, the performance of a data processing operation may nevertheless not be optimum because of the particular microinstruction flow path which the data processor is caused to follow in performing the operation and the time required to make the various branching decisions. The difficulties in optimizing a data processing operation are further complicated by the fact that the provision of a particular microprogram flow path in order to optimize one type of operation may deleteriously affect the performance of other operations.

SUMMARY OF THE PRESENT INVENTION

Accordingly, it is the primary object of the present invention to provide improved means and methods for providing more optimum execution of a microinstruction flow path in a microprogrammed data processor.

Another object of the invention is to provide a microprogrammed data processor having improved means for controlling its microinstruction flow operations during the performance of a data processing operation.

A further object of the invention is to provide improved means and methods for providing greater flexibility in the handling of specialized types of sequencing situations.

The above objects are accomplished in a preferred embodiment of the invention by the provision of a microprogramming system which provides for the performance of a data processing operation using a microinstruction sequence which in the first instance assumes that no branching possibilities are present (i.e. each microinstruction sequence is assumed to be unconditional), even though one or more branching possibilities may in fact be present in the microinstruction flow path of the data processing operation. Accordingly, in the preferred embodiment disclosed herein, each microinstruction accessed from a microinstruction memory is accompanied by next address data which indicates the next microinstruction to be executed and which is available for use without the need to wait for the results of any system conditions testing, thereby providing for rapid microinstruction sequencing.

The above described rapid microinstruction sequencing is permitted to occur in the preferred embodiment disclosed herein so long as the assumed microinstruction flow conforms to the correct path required for the operation being performed, the correctness of microinstruction sequencing being monitored concurrently with the execution of each microinstruction for which a branching decision is required. When an incorrect assumed branching is detected, a correction cycle involving the present cycle, the next cycle or both is initiated to correct the microinstruction sequence and thereby maintain the sequence on the correct path. Thus, it is only when the assumed sequencing is incorrect that the normal rapid sequencing is interrupted, if necessary, in order to provide a correction. However, the number of times that correction need be made during performance of an operation can readily be minimized based on operating experience without the need of any hardware change simply by changing the next microinstruction address data accompanying the microinstructions so that the assumed microinstruction sequence is correct most of the time. Furthermore, in accordance with the invention, provision is made to implement the sequence correction operation in a particularly advantageous manner so as to facilitate correction, while also taking advantage of situations which make it possible to mask the correction time.

Still further, in the preferred embodiment disclosed herein, the implementation provided for sequence monitoring and correction is advantageously additionally utilized to provide greater flexibility in the handling of specialized types of sequencing situations, such as are involved, for example, in wait-loop and repeat situations.

The specific nature of the invention as well as other objects, features, advantages and uses thereof will become evident from the following detailed description taken in conjunction with the accompanying drawings.

BRIEF DESCRIPTION OF THE DRAWINGS

FIG. 1 is a block diagram of a digital data processing system employing microprogramming control means in accordance with the invention.

FIG. 2 illustrates the format of a typical microinstruction control word stored in the microinstruction memory 14 of FIG. 1.

FIG. 3 illustrates time relationships provided in the system of FIG. 1.

FIG. 4 is an electrical block diagram illustrating a preferred embodiment of the sequence controller 25 in FIG. 1.

FIG. 5 illustrates the format of a typical sequence control word stored in the sequence control memory 20 of FIG. 1.

FIGS. 6 and 7 are electrical circuit diagrams of logical circuits employed in the system of FIG. 1 for inhibiting application of the clock to selected flip-flops and registers.

FIG. 8 is a flow chart illustrating an example of a typical microinstruction flow structure which may be implemented in the system of FIG. 1.

FIG. 9 illustrates a plurality of microinstruction control words stored in microinstruction memory 14 in FIG. 1 and chosen in accordance with the microinstruction flow illustrated in FIG. 8.

FIG. 10 illustrates a plurality of sequence control words stored in sequencing control memory 20 in FIG. 1 and chosen in accordance with the microinstruction flow illustrated in FIG. 8.

FIG. 11 is a series of graphs illustrating examples of microinstruction sequencing which may be provided in the system of FIG. 1 in accordance with the invention.

FIG. 12 is a flow chart illustrating an example of a typical microinstruction flow structure which may be employed with the modifications indicated in FIGS. 13-15.

FIG. 13 illustrates how the sequence controller 25 illustrated in FIGS. 1 and 4 may be modified for providing greater microprogramming flexibility.

FIG. 14 illustrates a plurality of microinstruction control words stored in microinstruction memory 14 in FIG. 1 and chosen in accordance with the microinstruction flow illustrated in FIG. 12.

FIG. 15 illustrates a sequence control word stored in sequence control memory 20 in FIG. 1 and chosen in accordance with the microinstruction flow illustrated in FIG. 12.

FIG. 16 is a series of graphs illustrating examples of microinstruction sequencing which may be provided in a system employing the modifications indicated in FIGS. 13-15.

DETAILED DESCRIPTION OF THE INVENTION

Like numerals and characters represent like elements throughout the figures of the drawings.

Reference is initially directed to FIG. 1 which illustrates a digital data processing system employing microprogramming control means in accordance with the invention. For the sake of simplicity, block 8 in FIG. 1 represents conventional portions of a digital data processing system which may be employed in conjunction with the exemplary embodiment of the microprogramming control means of the present invention illustrated in the remaining portions of FIG. 1. As indicated, block 8 includes a memory storage unit (MSU) 10, an arithmetic logic unit (ALU) 11, an Input/Output Section (I/O) 12, and a timing control 13, each of which may be provided in any of a variety of well known forms presently available in the art.

A Read/Write microinstruction memory 14 in FIG. 1, which is preferably a programmable read-only memory (PROM), is provided to store a plurality of microinstruction control words. In a conventional manner, a selected microinstruction control word MCW is read out from microinstruction memory 14 into a microinstruction register 16 in response to a Read signal and an address provided by an address selector 18. It is to be understood that microinstruction memory 14 not only includes reading means but also includes writing means including a write input register 15 and a write address register 17 which, in response to a Write signal, permit control words to be written into the memory and/or modified, also in a conventional manner.

FIG. 2 typically illustrates the format of a microinstruction control word MCW which is read into microinstruction register 16 from microinstruction memory 14. As shown, each control word includes a microinstruction M, a sequencing control portion SC, and a next address portion NA. As is well known, microinstruction M typically comprises a plurality of bits which are applied to the elements of block 8 in FIG. 1 in order to provide for the performance of a particular microoperation as determined by the values of the bits making up the microinstruction. A typical manner in which microinstruction execution may be performed is illustrated, for example in U.S. Pat. No. 4,038,643.

The next address portion NA of the typical control word illustrated in FIG. 2 contains bits designating an assumed next microinstruction address. These NA bits may themselves designate the next microinstruction address, or else, may cause address selector 18 to select the address in one of the auxiliary address registers 28, 29 or 30 as the next microinstruction address. As will hereinafter be considered in further detail, this next address portion NA is directly available from microinstruction register 16 for use in accessing the next microinstruction independently of the results of the execution of the current microinstruction and without the need of any system condition testing.

The sequencing control portion SC of the typical microinstruction control word illustrated in FIG. 2 contains sequence control data bits for use in providing correct microinstruction sequencing in the event that the next microinstruction is not to be that designated by the next address NA portion of the microinstruction control word. As will hereinafter be described in more detail, this sequencing control portion SC is applied as an address to a sequence control Read/Write memory 20 in FIG. 1 which, like microinstruction memory 14, is preferably also a PROM. Also, like memory 14, writing means including a write input register 21 and a write address register 23 are provided to permit sequence control words to be written into memory 20 and/or modified.

Before continuing with the description of FIG. 1, the timing relationships which may typically be employed in connection with the particular embodiment of the invention being disclosed herein will be briefly considered. Although timing may be provided in a variety of known ways for a microprogrammed digital data processing system in accordance with the invention, it will be assumed for illustrative purposes that timing within the data processing system illustrated in FIG. 1 is synchronous with one microinstruction being performed during each machine cycle. It will also be assumed that all registers and flip-flops are set at the same time by a clock occurring at the end of each cycle, as shown in the upper graph of FIG. 3. A typical manner in which the logic interconnecting the flip-flops and registers may be controlled in accordance with the microinstruction signals M read into the microinstruction register 16 in FIG. 1 is illustrated for example in FIG. 4 of the aforementioned U.S. Pat. No. 4,038,643.

It will be understood that the operating speed of the logic in the system is such that valid results of the logical operations performed during each machine cycle are applied to the inputs of the registers and flip-flops in time to be set by the clock occurring at the end of the machine cycle. It is also to be understood that the timing control 13 illustrated in block 8 of FIG. 1 provides appropriate timing signals t in a conventional manner to the microinstruction memory 14 and the sequence control memory 20 as well as to the various registers, flip-flops, logic and other circuits in the data processor to provide appropriate timing therefor. In order not to confuse the drawings, the particular timing signals fed to these various elements will not be shown in the drawings, but are to be assumed as provided where appropriate.

The description of the embodiment of the invention illustrated in FIG. 1 will now be continued in the light of timing relationships considered above. It is to be understood that, in the embodiment being described, three types of operations normally occur concurrently during each current cycle as follows: (1) in response to an address provided by address selector 18, a microinstruction control word is read out from microinstruction memory 14 and set up in microinstruction register 16 at the clock occurring at the end of the current cycle unless inhibited by an inhibit signal I2 (which will be explained hereinafter); (2) the microinstruction M set up in microinstruction register 16 at the end of the previous cycle is executed during the current cycle and the results set up in the flip-flops and registers at the clock occurring at the end of the current cycle unless inhibited by an inhibit signal I1 (which will also be explained hereinafter); and (3) the sequence control portion SC of the microinstruction control word MCW contained in microinstruction register 16 during the current cycle addresses sequence control memory 20 during the current cycle to select a sequence control word SCW which, in conjunction with applied system condition signals (including signals produced during microinstruction execution), determines whether the assumed next microinstruction address NA contained in microinstruction register 16 during the current cycle is correct—if not, controller 25 provides for correcting microinstruction sequencing by selectively setting alternate address register 28 and flip-flops 32-35 at the clock occurring at the end of the cycle, and by selectively producing one or both of inhibit signals I1 and I2 (see the lower two graphs in FIG. 3).

As illustrated in FIG. 1, address selector 18 has a plurality of possible next addresses applied thereto, only one of which is selected in response to address selection flip-flops 32-35 for addressing a microinstruction control word in microinstruction memory 14 at the beginning of each machine cycle. The various possible microinstruction addresses illustrated in FIG. 1 are as follows: (1) address NA in microinstruction register 16; (2) one of a plurality of alternate next addresses set up in an alternate address register 28 by sequence controller 25; (3) a next operation starting address stored in a next operation address register 29 and indicating the starting microinstruction address of the next operation to be performed; (4) a subroutine return address stored in a subroutine return address register 30 for indicating the microinstruction address to which a microinstruction flow is to be returned after performing a subroutine; and (5) an external microinstruction address stored in an external address register 31 indicating, for example, an interrupt microinstruction starting address to be used during an interrupt operation.

In the particular embodiment being described herein, the operation of address selector 18 is such that, at the beginning of each cycle, it automatically selects the assumed next microinstruction address indicated by the next address portion NA contained in microinstruction register 16 for application to microinstruction memory 14 unless one of flip-flops 32–35 is true. If only flip-flop 32 is true, then address selector 18 selects the address in alternate address register 28 for use as the microinstruction address; if flip-flops 32 and 33 are true, address selector 18 selects the alternate address contained in next operator register 29 for use as the microinstruction address; if flip-flops 32 and 34 are true, address selector 18 selects the address in subroutine address register 30 for use as the microinstruction address; and if flip-flops 32 and 35 are true, address selector 18 selects the address in external address register 31 for use as the microinstruction address. It is to be understood that flip-flops 32–35 are of a type which are set at each clock in accordance with the true or false state applied to the flip-flop input when the clock occurs.

The detailed description of the invention will now be continued with reference to FIG. 4 which illustrates a preferred embodiment of the sequence controller 25 in FIG. 1, and also to FIG. 5 which illustrates the format of a sequence control word SCW applied to sequence controller 25.

As shown in FIG. 5, each sequence control word SCW comprises an alternate address portion AA, a branch index portion BI, and a conditions select portion CS which, as shown in FIG. 4, are respectively applied to an alternate address selector 42, a branch index selector 44, and system conditions selector 46 of sequence controller 25. The alternate address portion AA comprises one or more alternate microinstruction addresses. The conditions select portion CS provides condition selection data for determining which of a plurality of system condition signals are to be selected during the cycle. For example, the CS data may provide for selecting four out of a much larger number of system conditions provided by block 8 in FIG. 1. The branch index portion BI provides a plurality of subportions containing indexes and inhibit signal indications for determining and controlling which of various possible next microinstructions to which the microinstruction flow may sequence following execution of the current microinstruction.

Sequence controller 25 will now be considered in more detail in connection with FIG. 4. As shown, the conditions select portion CS of the sequence control word SCW is applied to conditions select logic 46 for determining which of a plurality of applied system condition signals are to be selected during execution of the current microinstruction. One possible form of circuit which could be used for system conditions selector 46 is illustrated in FIG. 7 of the aforementioned U.S. Pat. No. 4,038,643. However, since only simple selection logic is required for system conditions selector 46 in the preferred embodiment being considered herein, system conditions selector 46 is preferably implemented in the conventional form of a commercially available multiplexor using large scale integrated circuit chips. In such an implementation, the system condition signals applied to system conditions selector 46 from block 8 (FIG. 1), would constitute the multiplexor inputs, the conditions select portion CS of the sequence control word SCW would serve as selection signals for the multiplexor, and the multiplexor output signals would constitute the results of the selection. Address selector 18 in FIG. 1 as well as branch index selector 44 and alternate address selector 46 in FIG. 4 may similarly be implemented as multiplexors, since only straightforward selection is required to be provided by these circuits. Accordingly, these various selection operations can be performed very rapidly without the need to extend cycle operating time, thereby permitting true inhibit signals I1 and I2 to be provided, where appropriate, to inhibit the clock occurring at the end of the current cycle as will hereinafter be considered in connection with FIG. 3.

The output of system conditions selector 46 may typically comprise four bits corresponding to the states of four system conditions selected in response to the CS portion of the accessed sequence control word SCW. This four bit output of system conditions selector 46 is applied to branch index selector 44 for selecting one of up to 16 sub-portions which may, for example, be provided in the branch index portion BI of the sequence control word SCW. Since the preferred embodiment requires that only seven indexes be incorporated in the branch index sub-portions, redundancy may be provided to permit the selection to be simplified without detracting from the overall system conditions testing capability. In the particular embodiment being considered herein, it will be assumed, for example, that each sub-portion of BI includes one of seven index values having the following meanings: index 0 indicates that the assumed next microinstruction address in the next address portion NA of the microinstruction control word MCW currently stored in microinstruction register 16 is to be used as the next microinstruction; indexes 1–4 each designate a respective one of four alternate next microinstruction addresses provided by the alternate address portion AA of the sequence control word SCW; index 5 designates a Return to Subroutine next microinstruction indicating that the address in subroutine return address register 30 (FIG. 1) contains the address of the next microinstruction; and index 6 designates an End of Operation condition indicating that the address in next operator address register 30 (FIG. 1) contains the address of the next microinstruction. As will be considered in more detail hereinafter, each sub-portion of BI, in addition to one of the above index values, also includes a plurality of inhibit bits indicating whether none, one, or both of inhibit signals I1 and I2 are to become true during the current cycle.

As shown in FIG. 4, indexes 1–4 are applied to alternate address selector 42, while indexes 5 and 6 are respectively applied to flip-flops 32 and 33, there being no 0 index output. Thus, selection of a sub-portion containing a 0 index by branch index selector 44 during a current cycle is an indication that the assumed next microinstruction indicated by the NA portion of MCW in microinstruction register 16 is correctly to be used as the next microinstruction address.

Next to be considered is the effect of branch index selector 44 selecting a sub-portion containing one of the other indexes 1–6. Considering first indexes 1–4, it will be seen in FIG. 4 that index 1–4 output lines from branch index selector 44 are applied to alternate address selector 42 for use in selecting a corresponding one of four alternate next microinstruction addresses provided by the alternate address portion AA of the sequence control word SCW. Accordingly, when a sub-portion containing one of indexes 1–4 is selected by branch index selector 44, the corresponding alternate address is applied via alternate address selector 42 to alternate address register 28 (FIG. 1) and is set up therein at the clock occurring at the end of the current cycle. Selection of a sub-portion containing index 6 by branch selector 44 (which signifies a Return to Subroutine next microinstruction) causes return to subroutine flip-flop 34 to be set true by the clock occurring at the end of the current cycle, while selection of a subportion containing index 5 (which signifies an End of Operation situation) causes next operator flip-flop 33 to be set true by the clock occurring at the end of the current cycle.

In summary, therefore, it will be understood that selection by branch index selector 44 (FIG. 4) of a subportion containing one of indexes 1-6 during a current cycle serves the following purposes: (1) it signifies that the assumed next microinstruction indicated by the next address portion NA contained in microinstruction register 16 (FIG. 1) during the current cycle is incorrect; and (2) the particular one of indexes 1-6 selected identifies the correct next microinstruction address and provides for setting address register 28 or a respective one of address selection flip-flops 32 and 33 accordingly at the clock occurring at the end of the current cycle, as described in the previous paragraph.

The manner in which correct microinstruction sequencing is advantageously provided for in accordance with the invention by appropriate use of inhibit signals I1 and I2 will next be described in connection with the preferred embodiment being described herein. As mentioned previously, each sub-portion provided in the branch index portion B1 of the sequence control word SCW read out from sequence memory 20 (FIG. 1) includes, along with one of indexes 0-6, inhibit bits which cause branch index selector 44 (FIG. 4) to selectively provide true states for inhibit signals I1 and I2 during the current cycle. As shown in FIG. 3, each of inhibit signals I1 and I2, when true during a cycle, occur with an overlapping time relationship relative to clock C so as to thereby be able to inhibit application of clock C to a flip-flop or register. This may be accomplished, for example, as illustrated by the clock inhibiting circuit shown in FIG. 6 in which an AND gte 51 is provided in the clock input line. As will be seen from FIG. 6, an inhibit signal I is applied to one input of AND gate 51 via inverter 53, while clock C is applied to the other input of AND gate 51. Thus, when I occurs, clock C will be inhibited from appearing at the output of AND gate 51. The functioning of inhibit signals I1 and I2 in the preferred embodiment being described will next be considered.

Inhibit signal I1 is applied to the various flip-flops and registers which store the results of microinstruction execution in a manner so that when I1 becomes true it inhibits application of clock C to these flip-flops and registers during the cycle. This may be accomplished, for example, using the clock inhibiting circuit shown in FIG. 6. Thus, it will be understood that when I1 becomes true at the end of a cycle (see FIG. 3), it prevents the flip-flops and registers which store the results of microinstruction execution from changing during that cycle. Consequently, the selection of a subportion which results in producing a true inhibit signal I1 during a cycle has the effect of preventing storage of the results of the microinstruction being executed during the cycle, thereby inhibiting execution of the microinstruction currently stored in microinstruction register 16 (FIG. 1) during the cycle.

Considering now inhibit signal I2, it will be seen (FIG. 1) that I2 is applied to microinstruction register 16 so that, when I2 becomes true, it inhibits the setting of microinstruction register 16 by the clock occurring at the end of the cycle during which a true state if I2 occurs. The microinstruction control word MCW in microinstruction register 16 will thus remain unchanged. To accomplish this purpose, microinstruction register 16 may, for example, include a clock inhibiting circuit as illustrated in FIG. 6. It will be understood that by thus providing for inhibiting the setting of microinstruction register 16 during a current cycle makes it possible to prevent an incorrect assumed next microinstruction control word from being set up therein in response to an incorrect NA portion contained in microinstruction register 16 during the current cycle. Besides inhibiting the setting of microinstruction register 16, inhibit signal I2 also inhibits AND gates 59 in FIG. 1 to prevent incorrect assumed next microinstruction information contained in the NA portion of microinstruction register 16 during a current cycle from being applied to other parts of the processor.

Inhibit signal I2 additionally serves another purpose, namely, to set flip-flop 32 (FIG. 1) true at the clock occurring at the end of the cycle during which a true I2 signal occurs. Thus, output J of flip-flop 32 will be true during the next following cycle and is used for various purposes during this next cycle as follows: (1) signal J when true serves in a similar manner as that previously described for a true inhibit signal I1—that is, to inhibit microinstruction execution—which may be accomplished, for example, by ORing J with I1 in an OR gate 57 as shown in FIG. 7 to produce a resultant inhibit signal I which may be used for inhibiting application of clock C using, for example, the previously considered clock inhibiting circuit of FIG. 6; (2) signal J is applied to address selector 18 in FIG. 1 to cause an alternate address residing in alternate address register 28 to address microinstruction memory 14 during a cycle that J is true; and (3) signal J is applied to branch index selector 44 in FIG. 4 to inhibit operation thereof so that no system condition testing occurs during a cycle during which J is true.

Having described the functions of inhibit signals I1 and I2 provided by branch index selector 44 in FIG. 4, and also the functions of signal J provided by flip-flop 32 (FIG. 1), the manner in which these signals I1, I2 and J may advantageously be employed to provide correct microinstruction sequencing in accordance with the invention will now be considered in further detail by reference to FIGS. 8-11 which illustrate an example of how microinstruction sequencing may be provided in the preferred embodiment being described herein.

FIG. 8 illustrates an example of a typical microinstruction flow structure which may advantageously be implemented in the preferred embodiment of the invention being described herein. Each of the blocks in FIG. 8 (e.g., blocks A, B, C, etc.) is a microinstruction block representing the performance of the particular labeled microinstruction in a single machine cycle. Each of the blocks (e.g., T1, T2, T3, etc.) in FIG. 8—which are angularly rotated 90° relative to the microinstruction blocks—is a decision block in which a decision is made as to which of a plurality of possible next microinstructions is to be the next microinstruction, the decision being based on the states of the particular set of system conditions selected by systems condition selector 46 during the cycle. It will be understood from the previous description provided herein that, in the preferred embodiment being described, the sequencing decision indicated by a decision block in FIG. 8 is provided during the same cycle as the execution of the corresponding microinstruction whose output is shown flowing to the decision block in FIG. 8. Each circled "e" designation in FIG. 8 signifies an end of operation condition, in which case the next microinstruction is the starting microinstruction of the next operation, the address of which is contained in next operation register 29 in FIG. 1. The double flow lines in FIG. 8 illustrate assumed microinstruction paths which are provided in accordance with the invention by appropriate choice of next microinstruction address NA values in the applicable microinstruction control words MCW contained in microinstruction memory 14 in FIG. 1, as will next be considered with reference to FIG. 9.

FIG. 9 illustrates a plurality of microinstruction control words MCW-A, MCW-B, etc. (of the type typically illustrated in FIG. 2) stored in microinstruction memory 14 which are chosen so as to implement the microinstruction flow shown in FIG. 8. For example, the assumed next addresses NA in FIG. 9 provided for control words MCW-A, MCW-B, and MCW-C containing microinstructions A, B, and C are addr B, addr C, and addr D, respectively, in conformance with FIG. 8. As other examples, it will be seen that microinstruction control words MCW-D, MCW-E, MCW-F, MCW-G, MCW-H, MCW-I and MCW-J in FIG. 9 containing microinstructions D, E, F, G, H, I and J, respectively, each contain an "e" assumed next address NA, again in conformance with FIG. 8, an "e" indicating that the assumed next address is the next operation starting microinstruction address contained in next operation register 29 in FIG. 1. It is of particular significance to note that an assumed next address is provided for each sequence control word in FIG. 9 even though a branching decision is required to determine the next microinstruction. For example, note that, in conformance with the double lines in FIG. 8, microinstruction control word MCW-B assumes a next microinstruction NA of addr C, while MCW-C assumes a next microinstruction address NA of addr D.

It will thus be understood that an operation requiring the microinstruction sequence A, B, C, D, e, which conforms to the assumed flow shown in FIG. 8, would be performed in just five machine cycles without the need to wait for any system conditions testing in order to provide branching decisions even though this sequence passes through the three decision blocks T1, T2 and T3 shown in FIG. 8, each of which requires the testing of particular system conditions. When such system condition testing occurs at a branching point in a conventional microprogramming system, extra time is normally required in order to permit a branching decision to be made.

As will be remembered from the previous consideration of FIG. 2, each microinstruction control word MCW stored in microinstruction memory 14 also includes a sequence control portion SC. In FIG. 9 each sequence control portion has a particular T designation added thereto indicating, in conformance with FIG. 8, a particular set of system conditions, if any, which are to be selected during the same cycle that the associated microinstruction is being executed for use in making a branching decision. For microinstruction control words which in accordance with FIG. 8 do not require a branching decision to be made, such as, for example, MCW-A, MCW-E, etc., the SC portions thereof are provided with a T0 designation indicating a no branch situation in which case no system condition selection is required during the cycle. On the other hand, for microinstruction control words, such as for example MCW-B and MCW-C which in accordance with FIG. 8 require that a branching decision be made, the SC portions thereof are provided with a T indication representing the particular set of system conditions which are selected during the cycle for making the branching decision. For example, MCW-B has a SC-T1 sequence control portion while MCW-C has a SC-T2 sequence control portion, wherein T1 represents one set of selected system conditions, while T2 represents a different set of selected system conditions.

FIG. 10 illustrates the contents of a plurality of sequence control words SCW-T0, SCW-T1, etc. stored in sequence control memory 20 in FIG. 1, which are addressed by the respective sequence control portions SC-T0, SC-T1, etc. of the microinstruction control words illustrated in FIG. 9 during a cycle that the corresponding microinstruction is being executed. It will be remembered from the previous consideration of a typical sequence control word in connection with FIG. 5 that it contains a conditions select portion CS, a branch index portion BI, and an alternate address portion AA. Each conditions select portion CS in FIG. 10 serves to cause system conditions selector 46 in FIG. 4 to select from the plurality of system conditions provided by block 8 (FIG. 1) the particular set of system conditions which are to be used during the cycle by branch index selector 44 in selecting a branch index sub-portion for use in controlling branching. For example, if block 8 provided 120 system conditions $C_1-C_{120}$, T1 could represent the selection of the four independent conditions $C_1$, $C_2$, $C_{59}$ and $C_{120}$.

Each alternate address portion AA of a sequence control word in FIG. 10 comprises one or more microinstruction addresses (chosen in accordance with FIG. 8) which may be selected by alternate address selector 42 in FIG. 1 for use as the next microinstruction address in the event that the assumed next microinstruction is incorrect. For example, sequence control word SCW-T3 in FIG. 10 will be seen to provide alternate addresses addr E, addr F, addr G and addr H in its alternate address portion in accordance with decision block T3 in FIG. 8.

The remaining portion to be considered in each of the typical sequence control words illustrated in FIG. 10 is the branch index portion BI. It will be remembered from the previous consideration of a typical sequence control word in FIG. 5 that the branch index portion BI provides a plurality of subportions, each including an index value indicating the correct next microinstruction along with inhibit bits which determine whether inhibit signals I1 and/or I2 are to become true or both remain false during the cycle. Typically, the branch index portion BI may contain up to 16 selectable sub-portions (corresponding to four selected system conditions provided by system conditions selector 46 in FIG. 4) which may be chosen as desired to provide an appropriate variety of combinations of index and I1 and I2 values.

The branch index portions BI of each of the sequence control words in FIG. 10 are accordingly chosen in the preferred embodiment being considered to provide sub-portions having indexes and inhibit signal indications which will be able to provide for the various possible microinstruction flow paths indicated following each decision block in the microinstruction flow structure illustrated in FIG. 8. For example, it will be noted in FIG. 8 that decision block T1 may cause the flow to sequence to the assumed next microinstruction C or to one of alternate next microinstruction I, J, K or P. Thus, the branch index portion BI of sequence control word SCW-T1 (which is accessed during the cycle that microinstruction B is being executed) will at least contain branch index sub-portions designated in FIG. 10 as 000, 101, 210, 301 and 401, wherein the most significant digit of each such sub-portion designates one of the seven possible indexes 0–6, while the remaining two digits (which are either "1" or "0") respectively indicate whether I2 and/or I1 are to become true, a "1" indication corresponding to true, and the least significant digit corresponding to I2. Note that certain sub-portions (such as 000 and 101 for SCW-T1) are redundantly provided in the branch index portions BI, which has the advantage of simplifying selection by system conditions selector 46 (FIG. 4) in the event that the same sub-portion is to be selected for more than one possible combination of system conditions. Note also that sub-portion 000 is provided at least once for all BI portions, since it is selected when the assumed next microinstruction is correct and is usually accompanied by "0" indications for both I1 and I2. Since the selection of SCW-T0 corresponds to a no branch situation, all of its sub-portions are typically chosen to be 000.

It will thus be understood from the foregoing that sub-portion 101 of sequence control word SCW-T1 in FIG. 10 indicates an index of 1 calling for selection of addr I by alternate address selector 42 in FIG. 4, while the next following digits 0 and 1 indicate that I1 is to remain false while I2 is to become true during the cycle. As another example, sub-portion 201 in the BI portion of SCW-T1 in FIG. 10 indicates an index of 2 calling for selection of addr J along with the selection of false and true states, respectively, for I1 and I2.

At this point in the description, it will be useful to note that the present invention advantageously provides for expeditiously changing the assumed microinstruction flow path provided for a microinstruction flow structure such as illustrated by the double flow lines in FIG. 8 merely by appropriately modifying the next address portions NA of one or more of the microinstruction control words stored in microinstruction memory 14, and by corresondingly modifying appropriate ones of the sequence control words stored in sequence control memory 20 in FIG. 1. For example, assume that the microinstruction flow structure illustrated in FIG. 8 is to be modified so that the assumed flow is from microinstruction C to microinstruction N rather than from C to D. The implementation of this different assumed microinstruction flow path may readily be accomplished by: (1) changing the next address portion NA of microinstruction control word MCW-C in FIG. 9 from addr to addr N; (2) changing addr N in the alternate address portion AA of sequence control word SCW-T2 in FIG. 10 to addr D; and (3) interchanging the locations of sub-portions 000 and 101 of the branch index portion BI of SCW-T2 so that the sub-portion 000 (indicating a correctly assumed next microinstruction) will be selected when the results of system condition testing indicates that N is the next microinstruction. It should thus now be apparent how the present invention advantageously permits the assumed microinstruction flow path to readily be chosen or modified to provide the fastest possible execution time for a computer operation without requiring any hardware change.

Typical operation of the preferred embodiment of the invention will now be considered in more detail in connection with FIG. 11. For this purpose, the applicable microinstruction flow structure will be assumed to be that shown in FIG. 8 having the assumed microinstruction flow paths indicated by the double flow lines. It will also be assumed that this microinstruction flow structure of FIG. 8 is implemented by microinstruction control words stored in microinstruction memory 14 (FIG. 1) as illustrated in FIG. 9 in conjunction with sequence control words stored in sequence control memory 20 as illustrated in FIG. 10. It will further be assumed that four operations $O_1$, $O_2$, $O_3$ and $O_4$ are to be consecutively performed which will be designated as: $O_1 = A_1B_1C_1D_1$; $O_2 = A_2B_2K_2L_2$; $O_3 = A_3B_3C_3$; and $O_4 = A_4B_4P_4$; wherein A, B, C, etc. respectively correspond to like designated microinstructions in FIGS. 8–10, and wherein the subscript provided for each microinstruction designates the particular one of the four operations to which the respective microinstruction corresponds.

The top graph in FIG. 11 illustrates the clock occurring during each of a plurality of machine cycles. The next lower cycle graph in FIG. 11 indicates the number of cycles which have occurred since the start of the four operations $O_1$, $O_2$, $O_3$ and $O_4$ being performed in this illustrative example. The next lower graph M in FIG. 11 indicates the particular microinstruction contained in microinstruction register 16 (FIG. 1) during each cycle and is the particular microinstruction executed during the cycle unless completion of execution is prevented by a true I1 inhibit signal or by a true J signal occurring during the cycle. The I1 inhibit signal during these assumed operations is illustrated by the I1 graph in FIG. 11 and the signal J is illustrated by the J graph in FIG. 11. As pointed out previously, signal J provided by flip-flop 32 in FIG. 1 is set true by a true I2 inhibit signal occurring during the preceding cycle, the I2 inhibit signal occurring during these assumed operations being illustrated by the I2 graph in FIG. 11. An "X" provided over a microinstruction or other symbol in FIG. 11 during a cycle (e.g., see cycles 7, 13 and 16) indicates that the normal operations represented by the symbol has been overcome as a result of the inhibiting action of I1, I2 or J during the cycle.

Continuing with the consideration of the illustrative example of FIG. 11, the NA graph indicates the contents of the NA portion of microinstruction register 16 (FIG. 1) during each cycle and thus indicates the assumed next microinstruction address in accordance with the double flow lines in FIG. 8. An "e" designation in the NA graph indicates that the next operator address register 29 contains the next microinstruction address. The next lower T graph in FIG. 9 indicates the particular set of system conditions selected by the CS portion (FIG. 5) of the sequence control word read out of sequence control memory 20 (FIG. 1) during each cycle, the T1, T2, etc. designations corresponding to like designated decision blocks in the microinstruction flow structure of FIG. 8 and to like designated CS values illustrated in FIG. 10. A T0 in graph T during a cycle indicates that no system condition selection is required during the cycle in conformance with FIG. 8. The next lower Index graph in FIG. 11 indicates the index contained in the sub-portion selected by branch index selector 44 in FIG. 4 during each cycle in response to the states of the particular set of system conditions selected by system conditions selector 46 (FIG. 4).

The remaining graphs to be considered in FIG. 11 are the graphs designated Alt Addr Reg, Next Op FF, and Next Op Reg. The Alt Addr Reg graph indicates the microinstruction whose address resides in alternate address register 28 (FIG. 1) during a cycle as a result of being set up therein at the clock occurring at the end of the preceding cycle because an index 1, 2, 3 or 4 was selected by branch index selector 44 during the preceding cycle. The Next Op FF graph illustrates the true state of flip-flop 33 during a cycle as a result of being set up therein by the clock occurring at the end of the preceding cycle because an index 6 was selected by branch index selector 44 during the preceding cycle. The Next Op Addr Reg graph in FIG. 11 indicates the starting microinstruction of the next operation to be performed whose address is contained in next operator register 29 in FIG. 1 for use in addressing the next microinstruction during a cycle in which the next operator flip-flop 33 is set. As illustrated in FIG. 11, the next operation register 29 is set at the first cycle of each new operation to the starting microinstruction address of the next operation.

Having identified the various graphs of FIG. 11, it will now be described how the preferred embodiment of the present invention advantageously provides microinstruction sequencing for performing the illustrative four consecutive operations $O_1 = A_1B_1C_1D_1$; $O_2 = A_2B_2K_2L_2$; $O_3 = A_3B_3C_3$; and $O_4 = A_4B_4P_4$ being considered herein. It will be understood from FIGS. 8 and 11 that these four operations require the execution of 14 microinstructions involving passing through seven decision blocks, each of which requires testing in order to determine the next microinstruction. Yet, as shown by the Cycle graph in FIG. 11, these four operations are performed using just 18 cycles which is only four more than would be required if no branching possibilities were present.

Now considering FIG. 11 in more detail, it will be evident that the first operation $O_1$ comprised of microinstructions $A_1B_1C_1D_1$ and performed during cycles 1–4 conforms to the assumed flow illustrated for the microinstruction flow structure of FIG. 8. Thus, during each of cycles 1–4, the following occurs: (1) the designated microinstruction in microinstruction register 16 (graph M) during the cycle is executed; (2) the next microinstruction in microinstruction memory 14 is addressed in accordance with the assumed next address NA (graph NA, FIG. 11) also contained in microinstruction register 16 during the cycle; and (3) since no system condition selection is called for during the cycle (as indicated by a T0 value for graph T), sequence controller 25 (FIG. 4) does not interfere with the execution of the microinstruction in microinstruction register 16 during the current cycle, or the execution of the assumed next microinstruction in the next cycle. In cycle 4 (during which the last microinstruction $D_1$ of operation $O_1$ is executed) an end of operation "e" is correctly assumed, thereby causing address selector 18 to select the address of the starting microinstruction $A_2$ of operation $O_2$ contained in next operation register 29 for execution in the next cycle 5.

During cycles 5 and 6 the first two microinstructions $A_2$ and $B_2$ of operation $O_2$ are executed in the same manner as described for $A_1$ and $B_1$ of operation $O_1$, since the flow again conforms to that shown in the microinstruction flow structure of FIG. 8. However, since the correct next microinstruction following $B_2$ is $K_2$ and not the assumed microinstruction $C_2$, the selection of the set of system conditions corresponding to T1 during cycle 6 results in branch index selector 44 selecting sub-portion 301 of the branch index portion BI of SCW-T1 (FIG. 10). The thus selected Index 3 causes addr K to be selected from the alternate address portion AA of SCW-T1 which is set up in alternate address register 28 at the clock occurring at the end of cycle 6. Also, selection of sub-portion 301 of SCW-T1 during cycle 6 produces a true inhibit signal I2 (see I2 graph in FIG. 11) which causes flip-flop 32 (FIG. 1) to be set true by the clock occurring at the end of cycle 6, while at the same time preventing microinstruction register 16 from changing during cycle 6. As a result, cycle 7 serves as a correction cycle (as indicated by the "X's" provided for cycle 7), during which the true state of J inhibits execution of microinstruction $B_2$ still contained in microinstruction register 16 and the address of microinstruction $K_2$ set up in alternate address register 28 by the clock occurring at the end of cycle 6 is used for addressing the microinstruction control word MCW-K during cycle 7. Thus, during cycle 8 in FIG. 11, the correct next microinstruction $K_2$ will be contained in microinstruction register 16 and will thus be executed during cycle 8, following which the flow proceeds to perform the correctly assumed next microinstruction $L_2$ during cycle 9 in conformance with FIG. 8. Operation $O_2 = A_2B_2K_2L_2$ will thus be completed at the end of cycle 9.

Since the NA portion of MCW-L in FIG. 9 correctly assumes an "e" next microinstruction, the starting microinstruction $A_3$ of the next operation $O_3 = A_3B_3C_3$ contained in next operation register 29 is selected for execution during cycle 10 followed by execution of the correctly assumed next microinstructions $B_3$ and $C_3$ during cycles 11 and 12 in the same manner as previously described for $A_1B_1C_1$ of operation $O_1$. Because $C_3$ is the last microinstruction of operation $O_3$, the assumed next microinstruction $D_3$ is not correct. As a result, during cycle 12 when $C_3$ is executed, the subportion 601 (FIG. 10) of the branch index portion BI of sequence control word SCW-T2 will be selected by branch index selector 44 (FIG. 4) resulting in the selection of a 6 index and a true state of I2 during cycle 12. Thus, cycle 13 will be a correction cycle during which signal J will be true to inhibit execution of microinstruction $C_3$ remaining the microinstruction register 16 (FIG. 1) during cycle 13, and the end of operation flip-flop 33 will be true to cause the address of the starting microinstruction $A_4$ of the next operation $O_4 = A_4B_4P_4$ contained in next operation register 29 to be selected for addressing microinstruction memory 14 during cycle 13. Thus, microinstruction $A_4$ and the correctly assumed next microinstruction $B_4$ will be performed during cycles 14 and 15. However, since the correct next microinstruction of operation $O_4$ is $P_4$ and not $C_4$ as assumed, sub-portion 401 of sequence control word SCW-T1 (FIG. 10) is selected during cycle 15 resulting in the provision of a correction cycle during the next following cycle 16, followed by execution of the correct microinstruction $P_4$ during cycle 17, the operations occurring during cycles 15 and 16 being as previously described for cycles 7 and 8 in FIG. 11.

In order to provide further insight into the flexibility which is possible using the microprogramming system provided for the preferred embodiment of the invention being described, a particular illustrative situation will be assumed with regard to the execution of microinstruction $Q_4$ of operation $O_4$ during cycle 18 in FIG. 11. It will be assumed that the system condition selection provided during cycle 18 in accordance with decision block T4 in FIG. 8 may produce a result indicating that microinstruction $Q_4$ which is concurrently being executed during cycle 18 should not be executed, and that, instead, operation $O_4$ should be terminated after completion of microinstruction P4. This possibility may advantageously be implemented in the preferred embodiment by: (1) providing unconditional sequencing from P to Q (as illustrated in FIG. 8) which is achieved by choosing microinstruction control word MCW-P in FIG. 9 with an NA portion equal to addr Q and a sequence control portion equal to T0 indicating a no branch sequence; (2) providing T4 system condition selection concurrently with the execution of microinstruction Q along with an assumed "e" next microinstruction which is achieved by choosing microinstruction control word MCW-Q in FIG. 9 with an NA portion equal to "e" and a sequence control portion equal to SC-T4; and (3) providing a sub-portion 010 in the branch index portion BI of sequence control word SCW-T4 in FIG. 10 which, in the example of FIG. 11, is caused to be selected during cycle 18 when Q4 is being executed in the event that the states of the set of selected system conditions (corresponding to T4) indicates that microinstruction Q4 should not be executed. In such a case, as illustrated in FIG. 11, inhibit signal I1 will become true during cycle 18 to inhibit performance of Q4, while still permitting the assumed next microinstruction "e" in the NA portion (NA graph in FIG. 11) of the microinstruction register 16 (FIG. 1) to cause the address of the starting microinstruction A5 of the next following operation to be read out into microinstruction register 16 at the clock occurring at the end of cycle 18 for execution in the next cycle 19.

It will be understood that if the T4 system condition selection provided during cycle 18 indicates that Q4 should be executed after which the operation should terminate, then a sub-portion 000 would be selected which would not inhibit microinstruction execution during cycle 18 so that operation O4 would terminate without inhibiting the execution of Q4.

From the foregoing it should be evident how the choice and arrangement of the sub-portions of a branch index portion BI of each sequence control word SCW, and the selection of a particular sub-portion during each cycle may advantageously be employed to monitor microinstruction sequencing in a manner which permits correctly assumed sequencing to occur without delay or interference while providing for correcting of an incorrectly assumed sequence in an expeditious manner. In accordance with the present invention, further advantage may be taken of the implementation disclosed herein to achieve even greater microprogramming flexibility, particularly with regard to the handling of specialized types of sequencing situations, such as are involved, for example, when wait-loop and/or repeat operations are called for in a microinstruction data structure. The manner in which this greater flexibility may be achieved in the preferred embodiment being described herein will next be considered with reference to FIGS. 12-16.

FIG. 12 shows a microinstruction flow structure involving microinstructions X and Y which will be used to illustrate how a wait-loop and a repeat microprogramming situation may advantageously be handled using a modified form of the invention which will be described with reference to FIGS. 13-16.

As an example of a wait-loop situation, it will first be assumed that an operation $O_5 = X_5Y_5$ is to be performed using the data structure illustrated in FIG. 12. It will also be assumed that decision block T5 in FIG. 12 may produce a result indicating that microinstruction $Y_5$ cannot properly be executed because of the absence of certain required data which is not yet available. For example, the required data may have been accessed during the previous microinstruction $X_5$, but may not yet have been provided by the system memory, perhaps because the data resides in a secondary storage requiring a longer than usual access time. It will be understood that this type of wait-loop situation could be handled using the previously described implementation illustrated in FIGS. 1-11 by having addr Y as the assumed next microinstruction address in the microinstruction control word MCW-Y containing microinstruction Y, rather than having "e" as the assumed next microinstruction following Y as shown in FIG. 12 which is applicable to the modification being considered. A branch index sub-portion 010 would then be caused to be selected for each cycle that the required data is not available so as to inhibit execution of Y until the required data is available. However, in order to complete the assumed operation $O_5 = X_5Y_5$ it would be necessary to have a correction cycle in order to proceed to "e" rather than back to Y as assumed. In the modified form of the invention now being considered in connection with FIGS. 12-15, greater microprogramming flexibility is achieved which, among other advantages, eliminates the need for this correction cycle as will next be described.

It will be remembered that in the previous implementation described in connection with FIGS. 1-11, seven indexes 0-6 are provided respectively corresponding to seven possible next microinstructions, the selected index during a cycle being represented by the most significant digit of a selected branch index sub-portion. The basic advantageous characteristic of the modification now being considered resides in the provision of at least one additional index which provides for greater microprogramming flexibility by permitting selection of a sub-portion containing this additional index to appropriately vary the microprogramming sequencing operations normally performed during a cycle whereby to provide for different sequencing in appropriate circumstances. This will be illustrated herein by demonstrating how the provision of a single additional index 7 can advantageously be utilized to provide for greater flexibility by changing normal sequencing operations so that the production of a true I2 inhibit signal does not cause flip-flop 32 in FIG. 1 to be set, in which case signal J will not become true to inhibit microinstruction execution during the next cycle in the normal manner as explained previously herein.

FIG. 13 illustrates circuitry which may advantageously be provided for preventing setting of flip-flop 32 by a true I2 signal when a branch index sub-portion containing a 7 index is selected during a cycle. As shown in FIG. 13, the index 7 output line of branch index selector 44 is applied to one input of an AND gate 65 via an inverter 68 while inhibit signal I2 is applied to the other input of AND gate 65, the output of AND gate 65 being applied to the input of flip-flop 32. Thus, in this modification, I2 is applied to the input of flip-flop 32 via AND gate 65 instead of being directly applied thereto as in the previous implementation illustrated in FIG. 1. No other hardware additions or changes need be provided for this exemplary modification, so that the 0-6 index outputs, inhibit signal I1 and the other connections of inhibit signal I2 are provided and employed in the same manner as previously described for the embodiment shown in FIGS. 1 and 4. Thus, when a branch index sub-portion is selected during a cycle containing a 7 index along with a true inhibit I2 indication, the inverted index 7 inhibits AND gate 65 in FIG. 13 so as to prevent the true I2 inhibit signal from setting flip-flop 32 true.

Returning now to the operation $O_5=X_5Y_5$ being considered, it will be remembered that it is being assumed that decision block T5 in FIG. 12 may produce a result indicating that microinstruction $Y_5$ cannot properly be executed because of the absence of certain required data which is not yet available. In order to handle this situation in the modified implementation illustrated in FIG. 13 without the need for a correction cycle, microinstruction control words MCW-X and MCW-Y are provided in respective memories 14 and 20 (FIG. 1) as illustrated in FIGS. 14 and 15, respectively. In particular, it is to be noted that the branch index portion BI of SCW-T5 in FIG. 15 is provided with 701 and 711 sub-portions, a 711 sub-portion being used to handle the wait-loop situation presently being considered. Accordingly, if during execution of microinstruction $Y_5$ all of the data required for proper execution is not available, then the selected system conditions are caused to select a branch index sub-portion 711. This selection of sub-portion 711 results in both of inhibit signals I1 and I2 becoming true during the cycle. The true state of I1 inhibits execution of microinstruction Y, and the true state of I2 prevents the current microinstruction control word MCW-Y in microinstruction register 16 (FIG. 1) containing microinstruction Y from changing. However, flip-flop 32 is not set by the true state of I2, because of the inhibiting action of the inverted true index 7 output which is applied to AND gate 65 in FIG. 13 along with I2. As a result, execution of microinstruction Y will repeatably be attempted during each of a plurality of successive cycles, but will be inhibited for each cycle that the selected system conditions selects sub-portion 711 indicating that the required data is not available. When the required data ultimately becomes available, the selected system conditions will then select sub-portion 000 which permits microinstruction Y to be executed without being inhibited, following which operation $O_5=X_5Y_5$ is terminated without need of a correction cycle since SCW-Y in FIG. 14 contains an "e" assumed next address in conformance with the assumed sequencing indicated by the double flow line of the data structure of FIG. 12. The details of the operations occurring during the performance of this assumed operation $O_5=X_5Y_5$ will be evident from the graphs of FIG. 16 which are of the same form as the previously described graphs of FIG. 11, and will be understood in a like manner. It will be noted in FIG. 16 that, for illustrative purposes, two wait cycles occurring during cycles 2 and 3 are assumed to occur for which microinstruction $Y_5$ is inhibited as a result of the required data not being available. It will also be noted that microinstruction $Y_5$ is finally executed during cycle 4 as a result of the required data being available during that cycle.

As a second example of how increased microprogramming flexibility is achieved by the modification being described in connection with FIGS. 12-16, it will next be assumed that the operation $O_6=X_6Y_6Y_6Y_6$ is to be performed following the previously assumed $O_5$ operation, as illustrated in FIG. 16. It will be understood that operation $O_6$ requires that microinstruction $Y_6$ be repeated three times in succession. This type of repeat situation might arise, for example, where the previous microinstruction $X_6$ causes a repeat counter (not shown) to be set to a count of 2. The repeat counter is then decremented by one for each execution of $Y_6$, operation $O_6$ then terminating after the execution of $Y_6$ for which the counter is at a zero count. This type of repeat operation could be handled using the previously described implementation of FIGS. 1-11 by having addr Y as the assumed next microinstruction address in the microinstruction control word MCW-Y containing microinstruction Y, rather than having "e" as shown in FIG. 12 which is applicable to the modification being considered. A branch index sub-portion 000 would then be caused to be selected for each cycle that the counter has a count other than zero so as to automatically provide for repeating microinstruction Y. However, when a zero count is present during execution of Y, a correction cycle is required in order to proceed to "e" rather than back to Y as assumed. In the modified form of the invention now being considered in connection with FIGS. 12-15, the additional flexibility provided permits this repeat situation as well as the previously considered wait-loop example to be handled without the need for a correction cycle, as will next be described.

In the previously considered wait-loop example, an additional index 7 is provided for selective inclusion in one or more sub-portions (FIG. 15), and the circuitry of FIG. 13 is additionally provided for preventing setting of flip-flop 32 in FIG. 1 when a branch index sub-portion is selected, such as 701 or 711, containing a 7 index and a true I2 indication. It will be remembered that, in the wait-loop situation, sub-portion 711 is selected when the required data is not available, which in turn causes microinstruction $Y_5$ of operation $O_5=X_5Y_5$ to be inhibited, while retaining microinstruction control word MCW-Y in microinstruction register 16 (FIG. 1) for another attempted execution of $Y_5$ in the next cycle. In order to provide for the repeat situation occurring during the next following operation $O_6=X_6Y_6Y_6Y_6$, the same modifications illustrated in FIGS. 13-15 are advantageously employed with the difference that the system conditions selected during decision block T5 in FIG. 15 now cause a sub-portion 701 to be selected (instead of 711 as in the wait-loop situation) whenever the previously mentioned repeat counter (which for example is set to a count of 2 during $X_6$) has a count other than zero. Because of this selection of 701, the I1 inhibit signal remains false so that microinstruction $Y_6$ is not inhibited during the cycle. Thus, as illustrated in FIG. 16, microinstruction $Y_6$ will repeat three times before operation $O_6$ is terminated without the need for a correction cycle.

Although the description of the invention provided herein has been primarily directed to particular illustrative embodiments in order to clearly demonstrate the basic principles of the invention and the manner in which it may be readily practiced so as to take advantage of the stated features and advantages, it is to be understood that many modifications and variations in structure, arrangement, components, operation and use are possible within the contemplated scope of the invention without departing from the spirit of the invention. The appended claims are accordingly intended to cover and embrace all such possible modifications and variations within the true spirit and scope of the invention.

What is claimed is:

1. In a cyclically operating microprogrammed data processing system having a plurality of possible states indicating system conditions and wherein a cycle corresponds to the time between clock pulses, the combination comprising:

microinstruction memory means for storing selectively addressable microinstruction control words each containing a microinstruction to be executed and an accompanying sequencing control portion;

microinstruction memory output means for storing a microinstruction control word read out from said microinstruction memory means;

microinstruction execution means for executing during a cycle a microinstruction contained in a microinstruction control word stored in said output means;

addressing means operable concurrently with said execution means during a cycle for addressing said microinstruction memory means so as to read out a next microinstruction control word therefrom for storage in said output means; and sequencing control means operable concurrently with said execution means and said addressing means during a cycle, said sequencing control means being responsive to a sequencing control portion stored in said output means during a cycle and the states of selected system conditions for providing during the same cycle a microinstruction control indication, and a plurality of inhibit indications;

said sequencing control means including logic circuit means responsive to said inhibit indications for selectively controlling storage in said output means of a microinstruction control word read out of said microinstruction memory means and also selectively controlling execution of the microinstruction contained in said output means during a current cycle and during the next occuring cycle;

said logic circuit means being responsive to said microinstruction control indication when it is of a first type for controlling the addressing provided by said addressing means in the next cycle and when it is of a second type for modifying the operations provided by said logic circuit means in response to said inhibit indications.

2. The invention in accordance with claim 1, wherein said sequencing control means operates to select particular system conditions from those provided by said data processing system during a cycle in response to selection information derived from the sequencing control portion contained in a microinstruction control word stored in said output means.

3. The invention in accordance with claim 1, wherein said inhibit indications provided by said sequencing control means during a cycle selectively comprise neither, one or both of first and second inhibit signals, wherein said system includes storing means for storing the results of microinstruction execution during a cycle, wherein said logic circuit means is responsive to said first inhibit signal being provided during a cycle so as to prevent storage of microinstruction execution results obtained during the cycle in said storage means, and wherein said logic circuit means is responsive to said second inhibit signal being provided during a cycle so as to prevent a microinstruction control word read out from said microinstruction memory means during the cycle from being stored in said output means.

4. The invention in accordance with claim 3, wherein said logic circuit means is additionally responsive to said second inhibit signal being provided during a cycle so as to prevent storage of microinstruction execution results in said storage means during the next following cycle.

5. The invention in accordance with claim 4, wherein said logic circuit means is responsive to a next microinstruction control indication of said second type provided during a current cycle to modify its operations in a manner so as to permit storage of microinstruction execution results in said storage means during the next following cycle, while still preventing a microinstruction control word read out from said microinstruction memory means during a current cycle from being stored in said output means.

6. The invention in accordance with claim 5, wherein each microinstruction control word contains an assumed next microinstruction address portion, wherein said microinstruction control indication of said first type indicates whether the assumed next microinstruction is the correct next microinstruction to be executed, wherein said sequencing control means is responsive to an indication that the assumed next microinstruction is the correct next microinstruction for causing neither of said first and second inhibit signals to be produced, and wherein said sequencing control means is responsive to an indication that the assumed next microinstruction is not the correct next microinstruction to cause at least one of said first and second inhibit signals to be produced.

7. The invention in accordance with claim 6, wherein said sequencing control means is additionally responsive to an incorrect next microinstruction indication for determining the correct next microinstruction address, and wherein said logic circuit means is responsive to an incorrect next microinstruction indication to cause said addressing means to next address said microinstruction memory means with the correct next microinstruction address determined by said sequencing control means.

8. The invention in accordance with claim 1, wherein said sequencing control means includes sequence control memory means for storing selectively addressable sequence control words each containing a branch index portion and a condition select portion; wherein said sequence control memory is addressed during a cycle to read out a selected sequence control word in response to the sequencing control portion contained in a microinstruction control word stored in said output means; wherein said selected system conditions are selected by said sequencing control means during a cycle in response to the conditions select portion of a sequence control word read out from said sequence control memory means during the cycle; and wherein said microinstruction control indication and said plurality of inhibit indications are provided by said sequencing control means during the cycle in response to the branch index portion of a sequence control word read out from said sequence control memory means during the cycle.

9. The invention in accordance with claim 8, wherein each sequence control word additionally includes an alternate address portion indicating at least one alternate next microinstruction address, and wherein said logic circuit means is selectively operable in response to a microinstruction control indication of said first type to select said alternate next microinstruction address as the correct next microinstruction address for use by said addressing means in the next cycle.

10. The invention in accordance with claim 8, wherein said microinstruction memory means and said sequence control memory means each comprise a programmable read-only memory.

11. In a cyclically operating microprogrammed data processing system having a plurality of possible states indicating system conditions and wherein a cycle corresponds to the time between clock pulses and wherein the system performs an operation using a microinstruction flow structure containing at least one branching point, the combination comprising:

microinstruction memory means for storing selectively addressable microinstruction control words, each microinstruction control word containing (a) a microinstruction to be executed, (b) an assumed next address portion indicating the address of the microinstruction control word containing an assumed next microinstruction, and (c) a sequencing contol portion for use in providing correct next microinstruction sequencing;

microinstruction memory output means for storing a microinstruction control word read out from said microinstruction memory means;

microinstruction execution means for executing during a cycle a microinstruction contained in a microinstruction control word stored in said output means;

addressing means operable concurrently with said microinstruction execution means during a cycle for normally addressing said microinstruction memory means so as to read out therefrom for storage in said output means in the next cycle the microinstruction control word indicated by the next address portion contained in a microinstruction control word stored in said output means during a current cycle;

sequencing control means operable concurrently with said execution means and said addressing means during a cycle, said sequencing control means being responsive to the sequencing portion of a microinstruction control word stored in said output means and the states of selected system condition signals for providing a microinstruction control indication, and a plurality of inhibit indications;

said sequencing control means including logic circuit means responsive to said inhibit indications for selectively controlling storage in said output means of said next microinstruction control word read out of said microinstruction memory means and also selectively controlling execution of the microinstruction contained in said output means during a current cycle and during the next occurring cycle;

said logic circuit means being responsive to said microinstruction control indication when it is of a first type for controlling the addressing provided by said addressing means in the next cycle and when it is of a second type for modifying the operations provided by said logic circuit means in response to said inhibit indications.

12. The invention in accordance with claim 11, wherein the assumed next address portion contained in each microinstruction control word indicates the next following microinstruction when a no branch situation is presented by said microinstruction flow structure and indicates the most likely following next microinstruction when a branch situation is presented by said microinstruction flow structure.

13. The invention in accordance with claim 12, wherein said sequencing control means selectively produces neither, one or both of first and second inhibit signals during a cycle in response to said inhibit indications provided during the same cycle, wherein said system includes storing means for storing the results of microinstruction execution during a cycle, wherein said logic circuit means is responsive to said first inhibit signal being provided during a cycle so as to prevent storage of microinstruction execution results obtained during the cycle in said storage means, and wherein said logic circuit means is responsive to said second inhibit signal being provided during a cycle so as to prevent a microinstruction control word read out from said microinstruction memory means during the cycle from being stored in said output means.

14. The invention in accordance with claim 13, wherein said logic circuit means is additionally responsive to said second inhibit signal being provided during a cycle so as to prevent storage of microinstruction execution results in said storage means during the next following cycle.

15. The invention in accordance with claim 14, wherein said logic circuit means is responsive to a next microinstruction control indication of said second type provided during a current cycle to modify its operations in a manner so as to permit storage of microinstruction execution results in said storage means during the next following cycle, while still preventing a microinstruction control word read out from said microinstruction during a current cycle from being stored in said output means.

16. In a cyclically operating microprogrammed data processing system including storing means for storing the results of microinstruction execution performed during a cycle wherein a cycle corresponds to the time between clock pulses, an improved method of providing for the sequencing of microinstructions in a microinstruction flow structure containing at least one branch point, said method comprising the steps of:

addressing a microinstruction memory during a first cycle so as to read out therefrom a first one of a plurality of microinstruction control words stored therein, each microinstruction control word containing a microinstruction to be executed, an assumed next address portion indicating the address of the microinstruction control word containing an assumed next microinstruction, and a sequencing control portion, said assumed next address portion being chosen to indicate the next following microinstruction when a no branch situation is presented by said microinstruction flow structure and to indicate the most likely following next microinstruction in said microinstruction flow struction when a branch situation is presented by said microinstruction flow structure;

normally addressing said microinstruction memory during a second cycle in accordance with the assumed next address portion contained in said first microinstruction control word so as to read out therefrom a second microinstruction control word;

executing the microinstruction contained in said first microinstruction control word during said second cycle and the microinstruction contained in said second microinstruction control word during a third cycle;

generating during said second cycle a microinstructure contol indication and a plurality of inhibit indications in response to selected system conditions and the sequencing control portion contained in said first microinstruction control word;

selectively controlling storing in said storage means of the results of microinstruction execution during said second and third cycles in response to said inhibit indications;

selectively controlling modification of normal addressing during said third cycle in response to the microinstruction control indication generated during the second cycle being of a first type; and modifying the selective controlling of storing of microinstruction execution results in said storage means normally produced by the inhibit indications generated during said second cycle in response to the microinstruction control indication generated during the second cycle being of a second type.

* * * * *

UNITED STATES PATENT AND TRADEMARK OFFICE
CERTIFICATE OF CORRECTION

PATENT NO. : 4,179,737
DATED : December 18, 1979
INVENTOR(S) : Dongsung R. Kim

It is certified that error appears in the above-identified patent and that said Letters Patent are hereby corrected as shown below:

Col. 9, line 35, change "gte" to --gate--.
Col. 16, line 40, change "the" to --in--.
Col. 23, line 15, change "contol" to --control--.

Signed and Sealed this

Twenty-fifth Day of March 1980

[SEAL]

Attest:

SIDNEY A. DIAMOND

Attesting Officer       Commissioner of Patents and Trademarks